United States Patent [19]

Enz et al.

[11] 3,793,639

[45] Feb. 19, 1974

[54] DEVICE FOR THE MAGNETIC STORAGE OF DATA

[75] Inventors: Ulrich Ernst Enz; Frederik Ate De Jonge, both of Emmasingel, Eindhoven, Netherlands

[73] Assignee: U.S. Philips Corporation, New York, N.Y.

[22] Filed: June 28, 1972

[21] Appl. No.: 267,142

[30] Foreign Application Priority Data

July 10, 1971 Netherlands ........................ 7109572

[52] U.S. Cl. . 346/74 M, 340/174 NA, 340/174 SR, 340/174 TF

[51] Int. Cl. ........................ G11c 19/00, G11c 11/14

[58] Field of Search340/174 TF, 174 SR; 346/74 M; 179/100.2 E

[56] References Cited

UNITED STATES PATENTS

| | | | |
|---|---|---|---|
| 3,503,054 | 3/1970 | Bobeck et al. | 340/174 TF |
| 3,641,518 | 2/1972 | Copeland | 340/174 TF |
| 3,646,530 | 2/1972 | Chow | 340/174 TF |
| 3,676,872 | 7/1972 | Lock | 340/174 TF |
| 3,711,840 | 1/1973 | Copeland | 340/174 TF |

OTHER PUBLICATIONS

Chang, et al., Bubble Domain Sensor Arrays for Magnetic Discs, IBM Technical Disclosure, Vol. 14, No. 7, Dec. 1971.

Lin, et al., Bubble Domain Functional Memory, IBM Technical Disclosure, Vol. 14, No. 7, Dec. 1971.

Magnetic Bubbles, Bobeck et al., Scientific American, June 1971, pp. 78–90.

*Primary Examiner*—Paul J. Henon
*Assistant Examiner*—Michael Sachs
*Attorney, Agent, or Firm*—Frank R. Trifari; Carl P. Steinhauser

[57] ABSTRACT

A device for the magnetic recording of information in which information is written on a magnetisable medium by means of the external field of a stable cylindrical magnetic domain which is supported by a plate of a magnetic material having an easy axis of magnetisation which extends normal to the plane of the plate. For writing a number of tracks present one beside the other on the medium, the plate may comprise one stable cylindrical magnetic domain per track to be written.

6 Claims, 12 Drawing Figures

DEVICE FOR THE MAGNETIC STORAGE OF DATA

Figure 1:
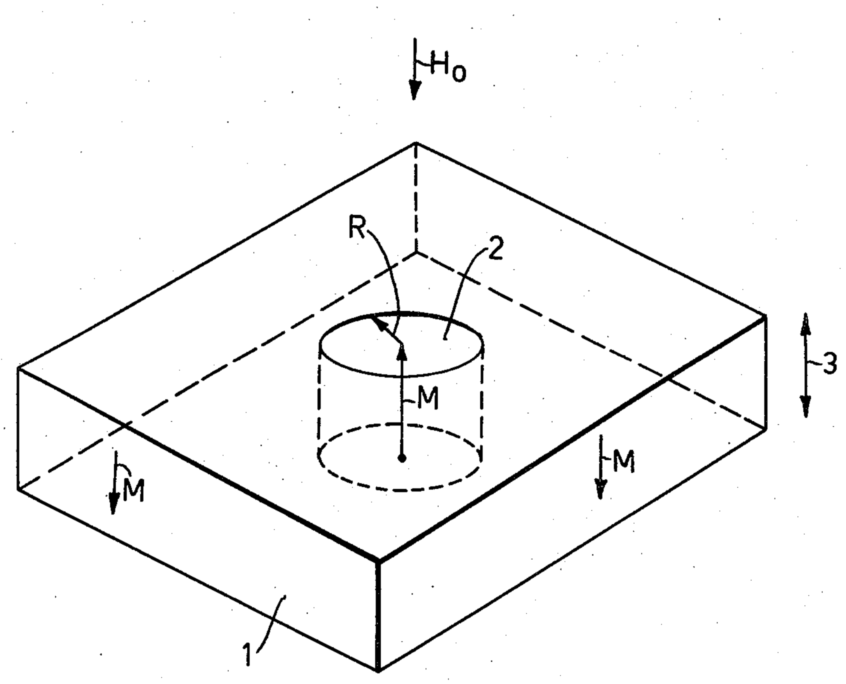

The invention relates to a device for the magnetic storage of data consisting of a remanent magnetisable medium provided on a carrier, for example, a tape, a disc or a drum, and a device cooperating therewith to cause a magnetic field to selectively influence the magnetisable medium.

Magnetic storage of data, i.e. the use of remanent magnetisations provided locally in ferromagnetic material to store both digital and analog data, is well known as well as the advantages involved: in principal high packing density of the data, after storage the information is immediately available and the information can be erased if necessary, it being even possible to selectively erase a restricted part of the stored information. It is to be noted that said advantages should actually be ascribed to the use of a magnetisable medium.

A limiting factor in the magnetic storage of data, however, is the conventional magnetic head which is used to cause a magnetic field to selectively influence the magnetisable medium. As is known, a magnetic head consists in principle of an annular core of ferromagnetic material which is provided with a gap and on which an electric winding is provided. For storing information, the head — in contact with or at a small distance from a magnetisable medium — cooperates with said medium which is selectively magnetised by the magnetic field which emanates from the core at the area of the gap when an electric current supplied to the winding produces a magnetic flux through the core.

In particular, on the one hand the dimensions of the conventional magnetic head and on the other hand the inertia which is associated with the mechanical movement of a head, prevent the optimum use of the high information packing density presented by magnetisable media.

The invention provides a quite new type of magnetic head which permits of better using the information packing density of the magnetisable media.

For that purpose, a device for storing information according to the invention is characterized in that the device for causing a magnetic field to selectively influence the magnetisable medium comprises a plate of a magnetic material which can support cylindrical magnetic domains, in which the material has an easy axis of magnetisation which extends substantially normal to the plane of the plate, a device for maintaining cylindrical magnetic domains produced in the plate, and domain propagation means for selectively moving a magnetic domain between previously determined positions, in such manner that the external field of a magnetic domain produced in the plate can influence the magnetisable medium.

Materials in which in particular single-walled, cylindrical magnetic domains can be produced and moved is described in Bell System Technical Journal Volume 46, nr. 8, October, 1967, pp. 1901 et. seq. Materials having this property are, for example, the rare earth orthoferrites. They have an easy axis of magnetisation which extends substantially normal to the plane of the plate. A cylindrical magnetic domain as meant above is observed in such a plate as a localized region in which the magnetisation is directed opposite to the direction of an external field along the easy axis, the direction of magnetisation of the surrounding regions of the plate corresponding to the direction of the external field.

The domain preferably assumes the shape of a circle (plan view) having a diameter which is determined by the parameters of the material of the plate and by the external "biasmagnetisation" field. This biasmagnetisation field which has a polarity which contracts the domains ensures that these can exist as stable units, so-called "bubbles". Various methods are known to move such domains from one position in the plate to another. Known applications are the movement of domains in a shift register operation, and a memory device in which a binary "zero" and a binary "one" in a memory place is represented by the presence of a domain in a first and second position, respectively.

Now, the invention is based on the discovery that the external field of a magnetic domain can also be used for writing on a magnetisable medium. According to the invention it presents several advantages if in devices for storing data the conventional magnetic head is replaced by a plate for a magnetic material which has an easy axis of magnetisation which extends substantially normal to the plane of the plate and which comprises cylindrical magnetic domains the external field of which is used to make select registrations on a magnetisable medium. It has actually proved possible to magnetize a magnetisable medium under the influence of the "bubble" field in the longitudinal direction under suitably chosen conditions as regards biasmagnetisation field, coercive force of the magnetisable medium and the material parameters of the "bubble" plate.

An important advantage is that a magnetic domain, dependent on the material parameter and on the biasmagnetisation field, can have a diameter between 1 and 10 microns. As will be described in greater detail hereinafter, this involves that information tracks to be written on a magnetisable medium may have a considerably smaller track width than is realisable by means of conventional magnetic heads.

Another advantage is that a plate of "bubble" material can simply be designed to support a number of magnetic domains one beside the other the external field of each of which can be used as a writing field. In this manner the complicated and hence expensive conventional multitrack head may be replaced by a "bubble" plate forming an "integrated" head.

A further advantage related to the preceding one is that the mechanical movement of a head over a number of tracks, as is usual in disc memories, is no longer necessary when a "bubble" plate is used as a head and which comprises one magnetic domain per track. The time required to write a bit can be considerably reduced thereby.

The above-mentioned advantages are united in a first preferred embodiment of the device for storing data according to the invention which is characterized in that binary information is recorded on the magnetisable medium in a number of tracks situated one beside the other, for which purpose the medium is arranged so as to be movable relative to and parallel to the plate which comprises one magnetic domain per track to be written, a circuit arrangement being present which is capable of determining at least two stable places in the plate for each domain.

When the return to a rest position is not necessary, two stable positions per "bubble" will be sufficient for writing binary "zeros" and "ones". However, without any problem the bubble plate may also be designed so that 3 stable positions per bubble are present of which one is a rest position. Of course, the required track width then increases by 1/3.

For the problem of magnetic storage of data at high frequencies and/or high packing density, a solution is often sought in writing successive signal elements on the medium in a direction which makes an angle with the direction of movement of the medium (generally a tape), the so-called "scanning". This provides the advantage that the actual tape speed can be reduced, but it suffers from the drawback that either a plurality of magnetic heads must be used involving the complex switching circuits required for that purpose, or one single magnetic head is used which is to be moved mechanically in a direction at right angles to the length of the tape.

The above-mentioned drawbacks are avoided when a "bubble" plate is used as a scanning magnetic head.

A further preferred embodiment of the device for the storage of data according to the invention is for that purpose characterized in that driving means are present to move the magnetisable medium along the plate, which plate comprises a magnetic domain for the zone-wise scanning of the magnetisable medium, which domain can be moved by means of a domain propagation device along an axis which makes an angle (preferably of 90°) with the direction of movement of the magnetisable medium, a circuit being present for the synchronous variation, in accordance with the variations of an electric signal bearing analogue information, of the position of the domain relative to the said axis.

An interesting application in this respect is the fact that the size of the magnetic domain also depends upon the strength of the bias field. This opens up the possibility of moving a bubble between two positions, while it can simultaneously be modulated in size by means of variation of the strength of the bias field.

An alternative preferred embodiment of a device for the storage of information according to the invention is for that purpose characterized in that driving means are present to move the magnetisable medium along the plate, which plate comprises, for the zone-wise scanning of the magnetisable medium, a magnetic domain which can be moved by means of a domain propagation device in a direction which makes an angle, (of preferably 90°) with the direction of movement of the magnetisable medium, a circuit being present for synchronously varying the size of the domain in accordance with the variations of an electric signal bearing analogue information.

It is known that the size of a "bubble" domain increases when the bias field decreases and that it decreases when the bias field increases, and that the difference between the minimum and maximum dimension may be a factor 3.

It is described in Journal of Applied Physics, vol. 42, nr. 4. pp. 1270 – 1272, March, 1971 that it is possible, when certain conditions are satisfied, to produce annular, "hollow" magnetic domains.

On the one hand it is an advantage of hollow domains that, in order to obtain the same variation in size as in the non-hollow domains, a variation of the bias field is necessary which is much smaller, for a variation in size by a factor 2, for example, 100 × smaller, than that which is required therefor in non-hollow domains. So a hollow domain has a much larger signal sensitivity.

On the other hand it is an advantage that the size of a hollow domain can vary much more than that of a non-hollow domain. A difference between minimum and maximum dimension of a factor 25 is possible. This means that larger signal variations can be established with the external field of a hollow magnetic domain than with the external field of a non-hollow magnetic domain.

A further preferred embodiment of a device for storing information according to the invention is therefore characterized in that the plate for the zone-wise scanning of the magnetisable medium comprises a hollow magnetic domain.

Known is the use of a magnetic field produced by a current conductor to control a bubble in which, for example, permalloy dots ensure stable places.

It is also possible, however, to control the movement of bubbles by means of electromagnetic radiation. It has actually been found that in, for example, orthoferrite crystals selective radiation causes a local decrease of the magnetic permeability, which gives rise to the fixation of a magnetic domain in that place, whereas in, for example, iron borate crystals selective radiation produced a local increase of the magnetic permeability, which gives rise to the change in place of a magnetic domain. At a suitably chosen temperature, the magnetic permeability reassumes its original value immediately after termination of the radiation.

A further preferred embodiment of the device according to the invention is characterized in that the magnetic material of the plate has the property that the magnetic permeability is variable by irradiation with electromagnetic radiation and that the domain propagation means comprise a source of electromagnetic radiation, which can irradiate the plate in the desirable places.

Figure 3:
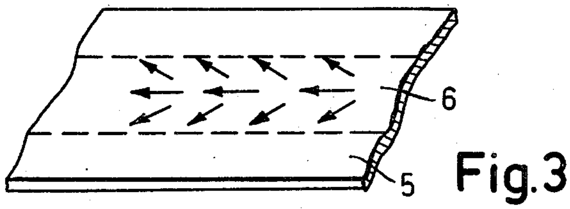
Figures 4, 5, 6:
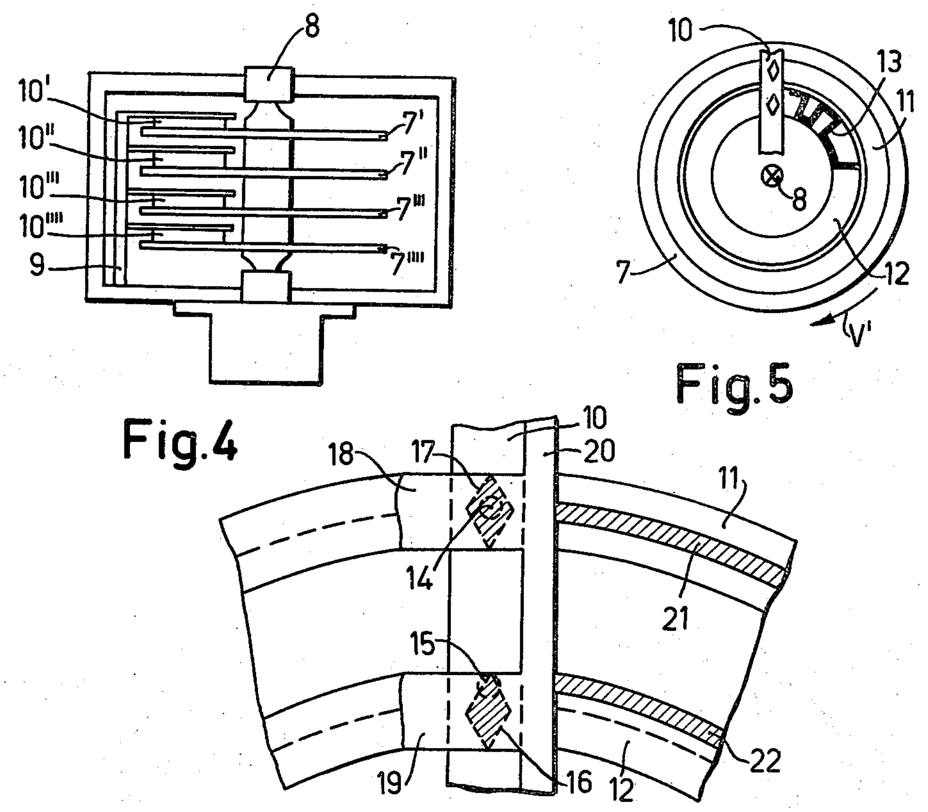
Figure 7:
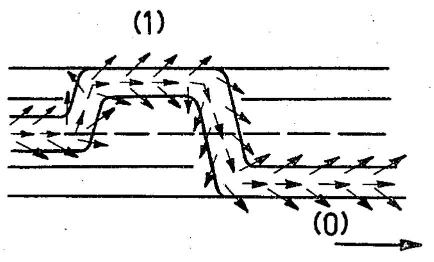
Figure 8:
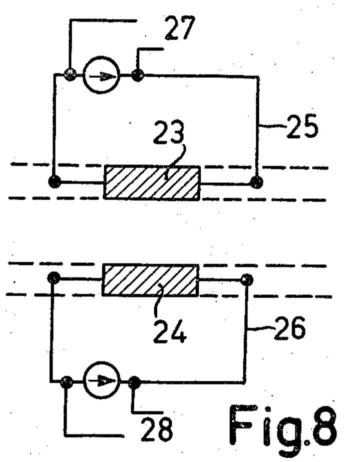
Figures 9, 9A, 10:
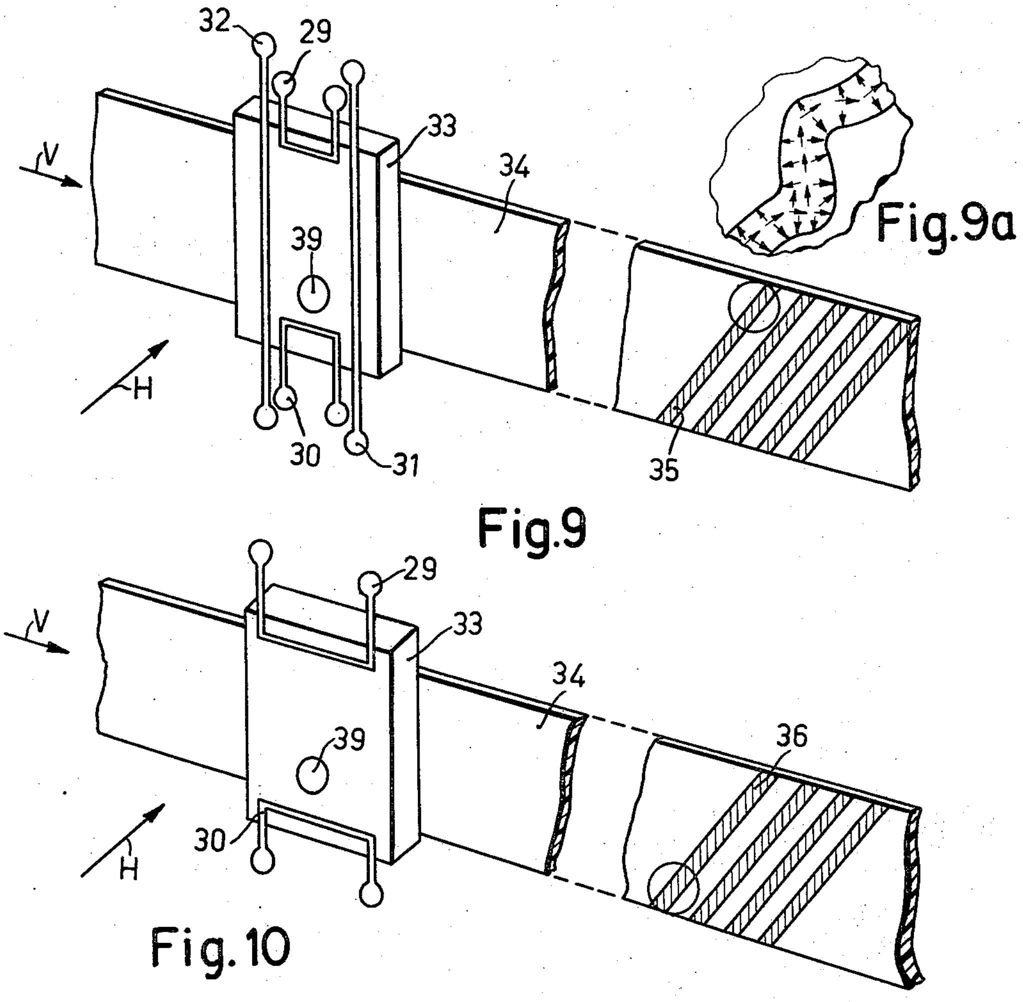
Figure 10A:
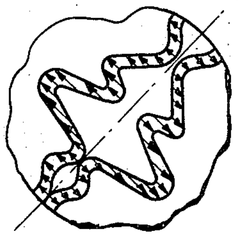

The invention will be described in greater detail, by way of example, with reference to the drawing. In the drawing FIG. 1 shows a plate of magnetisable material carrying a cylindrical magnetic domain therein, FIG. 2 shows the influence of the external field of a cylindrical magnetic domain on a magnetisable medium, FIG. 3 shows a magnetisable material having an information track written by means of the arrangement shown in FIG. 2, FIG. 4 is a cross-sectional view of a device for storing information according to the invention in the form of a disc memory, FIG. 5 is a diagrammatic plan view of the device shown in FIG. 4, FIG. 6 shows on an enlarged scale a part of the plan view shown in FIG. 5, FIG. 7 shows diagrammatically an information track written by means of a device according to the invention, FIG. 8 shows diagrammatically a device for reading the information track shown in FIG. 7, FIG. 9 shows a scanning device for storing information in which a cylindrical magnetic domain is movable in 2 directions, FIG. 9A shows an enlargement of the writing on the information tracks, shown as the circular area in FIG. 9, FIG. 10 shows a scanning device for storing information in which the size of the cylindrical magnetic domain is variable, FIG. 10A shows an enlargement of the writing on the information tracks, shown as the circular area in FIG. 10.

FIG. 1 shows a plate of a magnetisable material 1 having a thickness 3, which is cut from a crystal in such manner that the easy axis of magnetisation extends substantially normal to the plane of the plate. The plate is in an external field $H_o$ which is directed along the easy axis of magnetisation. In known manner a magnetic domain 2 having radius R is produced in the plate 1. The direction of magnetisation of this domain is opposite to the direction of magnetisation of the surrounding region of the plate 1.

Figure 2:
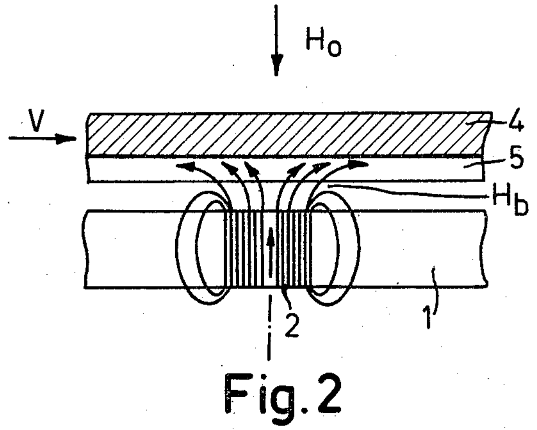

FIG. 2 is a cross-sectional view of the same plate as shown in FIG. 1 and this Figure shows how the external field $H_b$ of the magnetic domain 2 can magnetise in the longitudinal direction a magnetisable medium 5 which is provided on a carrier 4 and which is present at a very small distance from or in contact with the plate 1 which comprises the domain 2. In this case a number of conditions must be satisfied which will be illustrated with reference to the following example.

The following general conditions must be satisfied: the bias magnetisation field may not erase the information to be written on the magnetisable medium, so $H_o << 4\pi M_{med}$ ($H_o$ = field strength of the bias magnetisation field, $4\pi M_{med}$ = saturation magnetisation of the magnetisable medium).

The external field of the bubble must be capable of recording on the magnetisable medium, so $H_b > H_{C\text{medium}}$ ($H_B$ = field strength of the external field of the bubble, $H_{C\text{medium}}$ = coercive force of the magnetisable medium).

The bubble must be stable, so $H_O = h\, 4\pi M_S$ ($H_O$ = field strength of the bias magnetisation field, $4\pi M_s$ = saturation magnetisation of the bubble material), with $0<h<1$.

In a "bubble" material of a characteristic material length $L = \delta w/4\pi M_S = 0.08\ \mu$ ($\delta_w$ = wall energy per unit of surface, $M_S$ = saturation magnetisation of the "bubble" material), a thickness $d = 10\ \mu$, and a saturation magnetisation $M_S = 100$ Gauss, bubbles of radius $R = 1.5\ \mu$ can be produced with a bias magnetisation field $H_O = 960$ Oe and bubbles of radius $R = 0.55\ \mu$ with a bias magnetisation field $H_O = 1032$ Oe.

The external field of a bubble of radius $R = 1.5\ \mu$ available for longitudinal magnetisation of a magnetisable medium which is present at a distance of $1\mu$ from the "bubble" plate then is approximately 360 Oe at the area of the "bubble" wall. This field of 360 Oe is strongly local so that on the magnetisable medium which in this case must thus have a coercive force which is smaller than 360 Oe, a recording is made only at the area of the "bubble" wall. This means that an information track written by means of the external field of a bubble is very readily defined. When the magnetisation medium 5 is moved along the plate 1 in the direction of the arrow $v$, an information track 6 will be recorded on the magnetisable medium 5 as is shown diagrammatically in FIG. 3. The small arrows denote the local magnetisations.

The principle of the use for recording purposes of the external field of a cylindrical magnetic domain can suitably be used in a disc memory as is shown diagrammatically in FIG. 4. A number of discs 7', 7'' . . . 7'''' which are provided with a layer of magnetisable material can rotate about a shaft 8. A number of integrated magnetic heads in the form of "bubble" plates 10', 10'' . . . 10'''' which comprise one bubble per track to be written are secured to an arm 9. It is not necessary for such a plate to consist of one crystal. A plate having a length of, for example, 20 cm cam very readily be built up from separate chips having a length of, for example, 1 cm. To be considered, instead of a plate, is a layer which is sputtered or vapour-deposited on a substrate.

FIG. 5 is a plan view of a disc 7 which is provided with a magnetisable layer and which can rotate in the direction $v'$ about the shaft 8 and a "bubble" plate 10 cooperating with the disc 7. For the sake of clearness, only 2 information tracks, 11 and 12, respectively, are shown on a strongly exaggerated scale. In the present case, information 13 is recorded on the track 12.

FIG. 6 shows on an enlarged scale a part of the "bubble" plate 10 with the adjacent tracks of FIG. 5. This part of the plate 10 which is provided on a carrier (not shown) comprises a bubble 14 for writing the track 11 and a bubble 15 for writing the track 12. Rhombic permalloy patterns 16 and 17, for example 5,000 A. thick, are vapour-deposited on the plate and provide stable positions for the bubbles. Across said permalloy patterns are provided conductors 18 and 19 which are each connected to the conductor 20.

In the case shown, the conductor 18 conveys no current and the bubble 14 assumes a position in the center of the pattern 17. In this "rest" position the bubble writes the information 21 on the track 11.

The conductor 19 on the other hand does convey current in the case shown, as a result of which the bubble 15 is moved to the uppermost tip of the rhomb 16 by the field of the conductor. In this position the bubble writes information on the track 12 so that, for example, a binary "1" is represented. When the direction of the current through the conductor 19 is reversed, the bubble 15 is moved to the lowermost tip of the rhomb 16 and information will be written on the lower side of the track 12, so that, for example, a binary "0" is represented.

Binary information provided in a track in this manner is shown in FIG. 7. In case of a bubble diameter of 1.5 $\mu$, the track with such a method of recording will occupy a width of 18 microns, taking into account that two stable bubble positions, for example, have to be spaced apart three bubble diameters so as to prevent influencing. A manner of recording in which no rest position for the bubble is provided would in that case occupy a width only of 12 micron per track. This is considerably less than the tracks widths which can be realized with conventional magnetic heads.

Such an information track can be read out, for example, by means of the device shown diagrammatically in FIG. 8. The low-anisotropy strips of ferromagnetic material of 23 and 24, for example, consisting of layers of permalloy, 500 A. thick, vapour-deposited on a substrate, each constitute a magnetoresistance the resistance of which depends upon the magnetic field which the relevant strip "feels". For that purpose, the strips 23 and 24 are each connected to a current source. In circuits 27 and 28 coupled externally to the strip, current variations which are representative of the stored information can be detected. Such a device is described, for example, in the U.S. Pat. No. 3,493,694.

Another reading method which in itself is more sensitive comprises the use of magnetic field diodes.

FIGS. 9 and 10, in which the same reference numerals are used for the same components, show the principle of a scanning device for the storage of information according to the invention. A bubble plate 33 in which a bubble 39 is present, which is maintained by a bias field H which is directed along the easy axis of magnetisation of the plate is provided with conductors 29 and 30 which are energized so that the bubble under the influence of a field gradient moves in a direction transverse to the direction of movement of the magnetisable medium 34.

In FIG. 9, conductors 31 and 32 are also provided on the plate 33. By means of these conductors, a varying field is produced which follows the variations of a signal to be recorded. This field causes the position of the bubble to vary relative to its direction of movement so that a track 35 is written of which a part is shown on an enlarged scale in the inset.

In FIG. 10 the plate 33 is only provided with conductors 29 and 30 which are energized so that the bubble under the influence of a field gradient moves in a direction transverse to the direction of movement *v* of the magnetisable medium 34. The bias field H which maintains the bubble is not constant, however, as in the case shown in FIG. 9, but varies, in which it follows the variations of a signal to be recorded. Under the influence of this varying bias field, the size of the bubble 39 varies so that a track 36 is written of which a part is shown on an enlarged scale in the inset. What is claimed is:

1. A device for the magnetic storage of information consisting of a remanent magnetisable medium provided on a movable carrier, and means cooperating therewith having a magnetic field used to selectively magnetize the magnetisable medium, said means comprising a plate of a magnetic material having cylindrical magnetic domains therein, said material in said plate having an easy axis of magnetisation which extends substantially normal to the plane of the plate, means for generating and maintaing the cylindrical magnetic domains in the plate, and domain propagation means for selectively moving a magnetic domain between previously determined positions in the plate whereby the external field of a magnetic domain in the plate changes the state of remanence of the magnetisable medium in selected localities.

2. A device as claimed in claim 1, in which said plate of magnetic material is movable parallel and relative to and in close proximity to the magnetisable medium, said plate comprising one cylindrical domain for each information track to be recorded in said magnetisable medium, said plate having at least two stable horizontal positions for each cylindrical magnetic domain, and means for laterally displacing an equal distance each cylindrical magnetic domain in response to binary zeros and one to be recorded.

3. A device as claimed in claim 1, including driving means to move the magnetisable medium parallel and in close proximity to the plate, said plate comprising a magnetic domain for writing on the magnetisable medium, means for moving said domain along an axis which makes an angle with the direction of movement of the magnetisable medium, and means for moving the position of the domain relative to the said axis synchronously in response to variations of an electric signal bearing analog information.

4. A device as claimed in claim 1, including driving means for moving the magnetisable medium parallel and in close proximity to the plate, said plate comprising a magnetic domain for the writing on the magnetisable medium, means to move said domain in a direction which makes an angle with the direction of movement of the magnetisable medium, and means for synchronously varying the size of the domain in accordance with the variations of an electric signal bearing analog information.

5. A device as claimed in claim 4, wherein the plate for the writing scanning of the magnetisable medium comprises a hollow magnetic domain.

6. A device as claimed in claim 1 wherein the magnetic material of the plate has the property that its magnetic permeability is varied by irradiation with electromagnetic radiation and said domain propagation means comprise a source of electromagnetic radiation which can locally irradiate the plate for writing on said medium.

* * * * *